United States Patent [19]
Seki et al.

[11] 3,728,459
[45] Apr. 17, 1973

[54] CERTAIN N-SUBSTITUTED OCTADECADIENOIC ACID AMIDES USED TO REDUCE CHOLESTERAL LEVELS

[75] Inventors: Takashi Seki; Chiharu Saito, both of Toyonaka; Katsuyuki Toki, Nishinomiya; Keisuke Matsuka, Toyonaka; Yoshio Suzuki, Amagasaki; Akira Kobayashi, Ikeda, all of Japan

[73] Assignee: Sumitomo Chemical Co. Ltd., Osaka, Japan

[22] Filed: July 13, 1970

[21] Appl. No.: 54,648

Related U.S. Application Data

[63] Continuation-in-part of Ser. No. 478,758, Aug. 10, 1965, abandoned, which is a continuation-in-part of Ser. No. 342,682, Feb. 5, 1964, abandoned.

[52] U.S. Cl. .................424/324, 424/244, 424/248, 424/267, 424/274, 424/320
[51] Int. Cl. ............................................A61k 27/00
[58] Field of Search............................424/320, 324; 260/404; 167/655 C

[56] References Cited

UNITED STATES PATENTS

| 3,288,821 | 11/1966 | Kugeski.............................260/404 |
| 3,147,261 | 9/1964 | Mod et al. ...........................260/268 |
| 2,166,118 | 7/1939 | Bousquet et al..................260/294.7 |
| 2,166,120 | 7/1939 | Bousquet..........................260/294.7 |
| 3,248,396 | 4/1966 | Skau et al..........................260/294.7 |
| 3,193,458 | 7/1965 | Shapiro et al. ......................424/320 |

OTHER PUBLICATIONS

Chemical Abstracts 37: 37339 (1943).
Chemical Abstracts 57: 1609 C (1962).
Merck Index 8th ed. 1968 pg. 621.

*Primary Examiner*—Albert T. Meyers
*Assistant Examiner*—Leonard Schenkman
*Attorney*—Wenderoth, Lind & Ponack

[57] ABSTRACT

Method of reducing elevated level of cholesterol in blood by administering an N-substituted octadecadienoic acid amide is provided, as well as compositions containing the N-substituted octadecadienoic acid amide.

3 Claims, No Drawings

CERTAIN N-SUBSTITUTED OCTADECADIENOIC ACID AMIDES USED TO REDUCE CHOLESTERAL LEVELS

This application is a continuation-in-part of application Ser. No. 478,758 filed Aug. 10, 1965, which now abandoned in turn is a continuation-in-part of application Ser. No. 342,682, filed Feb. 5, 1964, now abandoned.

The present invention relates to a method for reducing the elevated cholesterol level in the blood. More particularly it relates to a method for reducing the elevated cholesterol level in the blood by orally administering an N-substituted octadecadienoic acid amide. The invention also pertains to a novel blood-cholesterol reducing composition containing an N-substituted octadecadienoic acid amide.

Atherosclerosis is one of the adult diseases which has not been provided with a satisfactory solution or treatment. A number of experimental and clinical facts have shown that the reduction of the elevated blood cholesterol level is one of the most important keys in treating or preventing atherosclerosis.

Unsaturated fatty acids such as linoleic acid or phenylalkylcarboxylic acid amide have been known as blood-chlosterol reducing agents. As regards their effectiveness, however, it is not very high, and is also uncertain and indefinite.

The present inventors have found that the elevated blood cholesterol level is efficaciously reduced by administering, preferably per os, an N-substituted octadecadienoic acid amide, and that its cholesterol reducing activity is superior to that of the known cholesterol reducing agents.

The amides suitable for use in the method of the present invention include several known compounds. However, they are disclosed as being useful antimicrobial agents, flame retardants or acyl-group identification agents. The amides employed in the present invention have never been recommended or suggested for therapeutical use in reducing the cholesterol level in the blood.

Accordingly, one object of the invention is to provide a method for reducing the elevated cholesterol level in the blood. Another object is to provide novel compositions which are useful for reducing the elevated cholesterol level in the blood. Other objects and advantages of the present invention will be apparent from the following description.

In order to accomplish these objects, the present invention provides a method for reducing the elevated cholesterol level in the blood in human patients having such elevated level, which comprises administering, preferably per os, to said patients 0.1 g. to 20 g. per day of an N-substituted octadecadienoic acid amide of the formula

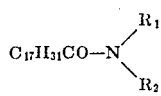

or

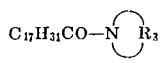

where $R_1$ is alkyl, cycloalkyl, lower alkyl-substituted cycloalkyl, hydroxycycloalkyl, lower alkoxy-substituted cycloalkyl, phenyl, lower alkyl-substituted phenyl, trifluoromethyl-substituted phenyl, lower alkoxy-substituted phenyl, halogen-substituted phenyl, halogen- and lower alkyl-substituted phenyl, benzyl, lower alkyl-substituted benzyl, α-lower alkyl-substituted benzyl, hydroxy-substituted benzyl or lower alkoxy-substituted benzyl having one to 36 carbon atoms, preferably one to 11 carbon atoms, $R_2$ is hydrogen or the same radicals as recited with respect to $R_1$, and $R_3$ is a bivalent alkylene, oxygen-containing alkylene or alkenylene radical having one to seven carbon atoms.

The present invention further provides a novel composition containing, in combination with a pharmaceutically acceptable carrier, an N-substituted octadecadienoic acid amide of the formula

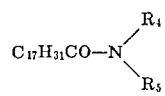

wherein $R_4$ is cycloalkyl, lower alkyl-substituted cycloalkyl, hydroxycycloalkyl, lower alkoxy-substituted cycloalkyl, phenyl, lower alkyl-substituted phenyl, lower alkoxy-substituted phenyl, halogen-substituted phenyl, trifluoromethyl-substituted phenyl, halogen- and lower alkyl-substituted phenyl, lower alkyl-substituted benzyl, α-lower alkyl-substituted benzyl, hydroxy-substituted benzyl or lower alkoxy-substituted benzyl having one to 36 carbon atoms, preferably one to 11 carbon atoms, and $R_5$ is hdyrogen or the same radicals as recited with respect to $R_4$. The N-substituted octadecadienoic acid amides of the composition of the present invention are all novel compounds.

The processes for preparing the amides employed in the present invention naturally vary, for example, depending upon the nature of $R_1$, $R_2$ and $R_3$, and origin of the acid moiety of the amides. Owing to their great number it is not possible to describe all of the processes in detail, which is in any case unnecessary since they are all based on conventional processes of organic chemistry. However, details of a typical suitable process for preparing the amides are presented below.

The N-substituted octadecadienoic acid amides used in the present invention may be produced by reacting an octadecadienoic acid of the formula $$C_{17}H_{31}COOH$$

with an amine of the formula

 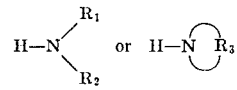

wherein $R_1$, $R_2$ and $R_3$ are as defined above, in the presence of absence of such dehydrating agents as a di-substituted carbodiimide compound, p-toluenesulfonic acid or p-toluene-sulfonyl chloride in an aqueous or organic solvent. Examples of the di-substituted carbodiimide compound include dicyclohexylcarbodiimide, diisopropylcarbodiimide and diphenylcarbodiimide. Examples of the organic solvent include benzene, toluene, n-hexane petroleum ether, dioxane, tetrahydrofuran, chloroform and ethylacetate. The reaction requires a relatively low temperature, e.g., room temperature, when it is carried out in the presence of a dehydrating agent, but requires a considerably high temperature, e.g., 200° C, when it is carried out in the absence of a dehydrating agent.

The octadecadienoic acid to be employed in the present invention may be of any origin. Usually linoleic acid originating from any of various natural fats and oils, specifically vegetable oils, and essentially composed of octadeca-9,12-dienoic acid of the formula $$CH_3(CH_2)_4CH=CH-CH_2-CH=CH-(CH_2)_7-COOH$$

is the most preferable material for the invention, although any other isomeride of octadecadienoic acid may also be employed. Comparatively pure linoleic acid can be obtained, for example, by the purification of safflower oil fatty acid by such methods as low temperature recrystallization method, distillation method, urea method, salt-recrystallization method, etc.

The octadecadienoic acid employed can be any of linoleic acid, conjugated linoleic acid, trans-linoleic acid and conjugated trans-linoleic acid.

Typical amines of the formula

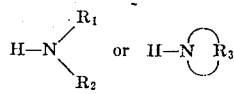

wherein $R_1$, $R_2$ and $R_3$ are as defined above, to be employed in the present invention are as follows. The present inventors have also proved that any other amines can be used without any trouble in carrying out the present invention so far as they are primary or secondary amines. Examples of suitable amines are mono- or di- lower alkylamines such as mono- or dimethylamine, mono- or diethylamine, mono- or di-n- or i-propylamine, and mono- or di-n-, i- or t-butylamine; mono- or di-higher alkylamines such as mono- or didodecylamine, mono- or dipalmitylamine and mono- or distearylamine; cycloalkylamines or their derivatives, such as cyclopentylamine, cyclohexylamine, cycloheptylamine, N-methyl-, N-ethyl-, N-n- or i-propyl or N-n, i- or t-butylcyclopentylamine, N-methyl- or N-ethyl-N-n(or i)-propyl- or N-n-,i- or t-butylcyclohexylamine, N-methyl-, N-ethyl, N-n- or i-propyl or N-n-,i- or t-butylcycloheptylamine, N-cyclohexyl- or N-phenyl-N-cyclohexylamine; lower alkylcycloalkylamines wherein the lower alkyl radical(s) is(are) e.g., one or more of methyl, ethyl, n- or i-propyl or n-, i- or t-butyl substituted in at least one of the 2, 3 and 4 positions; hydroxycycloalkylamines wherein at least one hydroxy radical is substituted in at least one of the 2, 3 and 4 positions; cycloalkylamines substituted by one or more lower alkyl and hydroxy radicals in at least one of the 2, 3 and 4 positions; and lower alkoxycycloalkylamines wherein the lower alkoxy radical(s) is(are), e.g.; one or more of methoxy, ethoxy, n- or i-propoxy, or n-, i- or t-butoxy radical substituted in at least one of the 2, 3 and 4 positions.

Aromatic amines are exemplified by aniline, diphenylamine, benzylamine, lower alkylaniline wherein the lower alkyl radical(s) is(are), e.g., one or more of methyl, ethyl, n- or i-propyl and n-,i- or t-butyl radicals substituted in at least one of the ortho, meta and para positions; N-methyl- or N-ethylanilines; lower alkoxyaniline wherein the lower alkoxy radical(s) is(are), e.g., one or more of methoxy, ethoxy, n- or i-propoxy, or n-, i- or t-butoxy substituted in at least one of the ortho, meta and para positions; halogenoaniline wherein the halogen atoms(s) is(are), e.g., one or more of fluorine, chlorine, bromine or iodine substituted in at least one of the ortho, meta and para positions; trifluoromethylaniline wherein at least one trifluoromethyl radical is substituted in at least one of the ortho, meta and para positions; aniline substituted by one or more of lower alkyl, halogen, lower alkoxy or trifluoromethyl radicals, such as 2,4,6-trimethylaniline and the fluorotoludines; dibenzylamine; α-lower alkyl-benzylamines such as α-methylbenzylamine, α-ethylbenzylamine, α-n- or i-propylbenzylamine, α-n-,i- or t-butylbenzylamine and the like; lower alkylbenzylamines wherein the lower alkyl group is, e.g., methyl, ethyl, n- or i-propyl, or n-,i- or t-butyl; lower alkoxybenzylamines wherein the lower alkoxy group is, e.g., methoxy, ethoxy, n- or i-propoxy, or n-, i- or t-butoxy substituted in at least one of the ortho, meta and para positions; hydroxybenzylamine wherein at least one hydroxy group is substituted in at least one of the ortho, meta and para positions; and benzylamines substituted by one or more of lower alkyl, lower alkoxy and hydroxy radicals.

Heterocyclic amines are exemplified by pyrroles, pyrrolidine, piperidine, hexamethyleneimine and morpholine.

The N-substituted octadecadienoic acid amides according to the present invention can also be employed to prevent the deposition of cholesterol and fat to the liver, which occurs in animals fed on a cholesterol diet. It seems that the amide compounds improve the suppressed lipid-metabolism function of the liver. This effectiveness is also favorable, in view of the fact tha the metabolism of lipids is carried out mainly by the liver. Such effectiveness has never been observed for linoleic acid.

The extremely low toxicities of the present N-substituted octadecadienoic acid amides are also an aspect of the present invention.

The cholesterol-lowering agent used in this invention may be orally administered. Usually the amount orally administered is 0.1 g. – 20 g. per day, preferably 0.5 g. – 5 g. per day, and the administration may be continued for 1 –5 months, usually for about 3 months. The cholesterol-lowering agent may be employed in any suitable form which is conventional for oral administration. Thus, it may be encased in a capsule, in liquid form, in tablet form, or in powder form. In preparing the agents in these various forms, the active compound may be used as such or mixed with or impregnated in a suitable solid carrier, e.g., cellulose acetate or it may be mixed with a liquid carrier such as an edible oil; e.g., safflower oil, and preferably those containing linoleic acid. It is also possible to use a mixture of two or more of the N-substituted octadecadienoic acid amides of the invention. It may also be used as mixed with linoleic acid.

The content of the N-substituted octadecadienoic acid amide of the composition of the present invention varies depending upon the kind of carrier used, and the content is adjusted so that the amide is administered to a patient within the indicated dosage range.

In the present invention, cycloalkylamides or α-($C_1$-$C_4$)- alkylbenzylamides are preferable with respect to the cholesterol reducing effect, and cyclohexyllinoleamide or α-methylbenzyllinoleamide are most preferred.

The cholesterol reducing activities of the N-substituted octadecadienoic acid amides used in the present invention are shown in the following test example. However, it is to be understood that the present invention is not limited thereto.

TEST EXAMPLE

Cholesterol-reducing test in mice

The effectiveness of each indicated compound was tested in mice fed on a specifical diet which was supplemented with cholesterol and bile acids. The composition of the specifical diet is shown as follows:

|  | % |
|---|---|
| Casein | 20.0 |
| Sucrose | 62.3 |
| Hydrogenated coconut oil | 10.0 |
| Agar | 2.0 |
| Salt mixture (U.S.P.) | 4.0 |
| Cod liver oil | 0.2 |
| Cholesterol | 1.0 |
| Ox bile extract | 0.5 |

To each kilogram of diet the following vitamins were added:

| | |
|---|---|
| Thiamin hydrochloride | 5.00mg. |
| Riboflavin | 5.00mg. |
| Pyridoxine hydrochloride | 2.50mg. |
| Calcium pantothenate | 50.00mg. |
| Nicotinamide | 80.00mg. |
| Folic acid | 2.00mg. |
| p-Aminobenzoic acid | 20.00mg. |
| Inositol | 1000.00mg. |
| Cyanocobalamin | 0.02mg. |
| Biotin | 0.20mg. |
| Choline chloride | 1500.00mg. |
| dl-α-Tochopheryl acetate | 10.00mg. |
| Menadione | 5.00mg. |

The blood cholesterol level of the mice had been elevated to 3 to 6 times the normal level. Each test compound as shown in Table 1 was well mixed in the specifical diet in an amount of 0.2 percent or 1 percent by weight and fed to the test animals for 8 to 12 days. At each dose level, 10 or 20 mice were used and the total cholesterol levels of the serum were measured at the end of the experimental period. One group of mice, in each set of experiments, was given the specifical diet without the test compound and served as control. The means value of the total cholesterol level of the serum of the treated group was expressed as a per cent of that of the control group (cholesterol level index).

TABLE 1

| Agents (physical properties) | Blood cholesterol level indices 1% administ. | 0.2% administ. |
|---|---|---|
| None (control) | 100 | |
| Linoleic acid | 74 – 78 | 101 – 104 |
| $C_{17}H_{31}CONH$-$C_2H_5$ (b.p. 138°–143°C/0.02mmHg $\eta_D^{19}$ 1.4687) | 72 | 104 |
| $C_{17}H_{31}CONH$—CH(CH$_3$)$_2$ (b.p. 164°–169°C/0.02mmHg $\eta_D^{25}$ 1.4720) | 67 | 85 |
| $C_{17}H_{31}CONHCH_2CH(CH_3)_2$ (b.p. 164°–169°C/0.02mmHg $\eta_D^{25}$ 1.48718) | | 93 |
| $C_{17}H_{31}CONHC_{12}H_{25}$ (wavy semisolid) | | 80 |
| $C_{17}H_{31}CON(CH_3)_2$ (b.p. 141°–143°C/0.02mmHg $\eta_D^{25}$ 1.4730) | 100 | 105 |
| $C_{17}H_{31}CON(C_2H_5)_2$ (b.p. 165°–171°C/0.02mmHg $\eta_D^{25}$ 1.4721) | 59 | 82 |
| $C_{17}H_{31}CON(CH(CH_3)_2)_2$ (b.p. 172°–178°C/0.02mmHg $\eta_D^{25}$ 1.4743) | 76 | 80 |
| $C_{17}H_{31}CON(CH_2CH(CH_3)_2)_2$ (b.p. 170°–173°C/0.02mmHg) | 63 | 86 |
| $C_{17}H_{31}CONH$—cyclopentyl (b.p. 175°C–178°C/0.03mmHg $\eta_D^{30}$ 1.4844) | 42 | 68 |
| $C_{17}H_{31}CONH$—cyclohexyl (b.p. 180°–181°C/0.02mmHg $\eta_D^{24}$ 1.4890) | 47 | 55 |
| $C_{17}H_{31}CONH$—cycloheptyl (b.p. 200°–202°C/0.02mmHg $\eta_D^{23}$ 1.4871) | 90 | 105 |
| $C_{17}H_{31}CONH$—(2-methylcyclohexyl) (b.p. 178°–182°C/0.04mmHg $\eta_D^{30}$ 1.4844) | 56 | 96 |
| $C_{17}H_{31}CONH$—(methylcyclohexyl) (b.p. 180°–183°C/0.03mmHg $\eta_D^{32}$ 1.4844) | 65 | 89 |
| $C_{17}H_{31}CONH$—C$_6$H$_{10}$—CH$_3$ | | |
| $C_{17}H_{31}CONH$—(hydroxycyclohexyl) (b.p. 181°–184°C/0.03mmHg $\eta_D^{32}$ 1.4850) | 47 | 93 |

| Compound | Data | Value 1 | Value 2 |
|---|---|---|---|
| | (b.p. 190°–199°C/0.03mmHg $\eta_D^{30}$ 1.4860) | 79 | 94 |
| C₁₇H₃₁CONH–⟨cyclohexyl⟩–OH | (b.p. 190°–202°C/0.04mmHg $\eta_D^{30}$ 1.4863) | 64 | 82 |
| C₁₇H₃₁CONH–⟨cyclohexyl with OCH₃⟩ | (b.p. 190°–195°C/0.1mmHg $\eta_D^{24.5}$ 1.5090) | 60 | 90 |
| C₁₇H₃₁CONH–⟨cyclohexyl⟩–OC₂H₅ | (b.p. 192°–195°C/0.1mmHg $\eta_D^{24}$ 1.4851) | 52 (0.4%) | 80 |
| C₁₇H₃₁CONH–⟨cyclohexyl with OCH₃⟩ | (b.p. 190°–195°C/0.1mmHg $\eta_D^{25}$ 1.4848) | 56 (0.8%) | 75 |
| C₁₇H₃₁CONH–⟨phenyl⟩ | (b.p. 190°–194°C/0.09mmHg $\eta_D^{25}$ 1.5050) | 71 | 101 |
| C₁₇H₃₁CONH–⟨phenyl-CH₃⟩ | (b.p. 190°–198°C/0.005mmHg $\eta_D^{30}$ 1.4962) | 58 | 88 |
| C₁₇H₃₁CONH–⟨phenyl⟩–CH₃ | (b.p. 189°–193°C $\eta_D^{31}$ 1.5000) | 71 | 92 |
| C₁₇H₃₁CONH–⟨phenyl⟩–OCH₃ | (m.p. 55°–57°C) | | 67 |
| C₁₇H₃₁CONH–⟨phenyl-Cl⟩ | (b.p. 185°C/0.09mmHg $\eta_D^{30.5}$ 1.4990) | | 67 |
| C₁₇H₃₁CONH–⟨phenyl⟩–F | (b.p. 195°–200°C/0.04mmHg $\eta_D^{25}$ 1.5012) | 78 | 93 |
| C₁₇H₃₁CONH–⟨phenyl⟩–F | (b.p. 200°–210°C/0.04mmHg $\eta_D^{20}$ 1.5035) | 80 | 96 |
| C₁₇H₃₁CONH–⟨phenyl⟩–Br | (b.p. 220°C/0.03mmHg $\eta_D^{24}$ 1.5250) | 79 | 86 |
| C₁₇H₃₁CONH–⟨phenyl-CF₃⟩ | (b.p. 200°–203°C/0.03mmHg $\eta_D^{29}$ 1.4833) | 72 | 85 |
| C₁₇H₃₁CON(CH₃)–⟨phenyl⟩ | (b.p. 191°–196°C/0.02mmHg $\eta_D^{31}$ 1.4897) | 61 | 86 |
| C₁₇H₃₁CON(C₂H₅)–⟨phenyl-CH₃⟩ | (b.p. 180°–190°C/0.01mmHg $\eta_D^{32}$ 1.4875) | 54 | 81 |
| C₁₇H₃₁CON(⟨phenyl⟩)₂ | (b.p. 180°–192°C/0.01mmHg $\eta_D^{32}$ 1.4880) | 43 | 66 |
| C₁₇H₃₁CONH–⟨phenyl-Cl⟩–CH₃ | ($\eta_D^{25}$ 1.4997) | 46 | (b.p. 180°–185°C/0.01mmHg) 61 |
| C₁₇H₃₁CONH–⟨phenyl-CH₃,Cl⟩ | (b.p. 185°–195°C/0.02mmHg $\eta_D^{27}$ 1.4965) | 50 | 63 |
| C₁₇H₃₁CONHCH₂–⟨phenyl⟩ | (b.p. 190°–192°C/0.1mmHg $\eta_D^{26}$ 1.4900) | 52 | 77 |
| C₁₇H₃₁CON(CH₂–⟨phenyl⟩)₂ | (b.p. 208°B–213°C/0.03mmHg $\eta_D^{24}$ 1.5155) | 67 | |
| C₁₇H₃₁CONH–CH(CH₃)–⟨phenyl⟩ | (b.p. 200°–205°C/0.05mmHg $\eta_D^{21.5}$ 1.4901) | 39 | 78 |
| C₁₇H₃₁CONH–CH(C₂H₅)–⟨phenyl⟩ | (b.p. 205°–209°C/0.04mmHg) | 40 | |
| C₁₇H₃₁CONH–CH(iso-C₃H₇)–⟨phenyl⟩ | (b.p. 215°–220°C/0.1mmHg $\eta_D^{26}$ 1.4948) | 39 | |
| C₁₇H₃₁CONH–CH(n-C₄H₉)–⟨phenyl⟩ | | | |

(b.p. 211°–215°C/0.11mmHg
$\eta_D^{20}$ 1.5017)    41

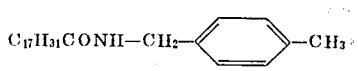

(b.p. 203°–206°C/0.06mmHg
$\eta_D^{27}$ 1.4853)    55

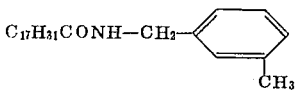

(b.p. 204°–209°C/0.06mmHg
$\eta_D^{27}$ 1.5027)    56

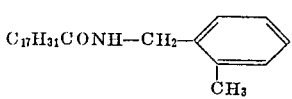

(b.p. 188°–193°C/0.02mmHg
$\eta_D^{27}$ 1.4982)    64

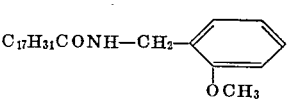

(b.p. 190°–203°C/0.03mmHg
$\eta_D^{27}$ 1.4952)    70

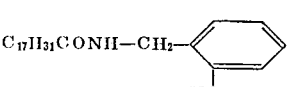

(b.p. 205°–211°C/0.02mmHg
$\eta_D^{30}$ 1.4860)    71

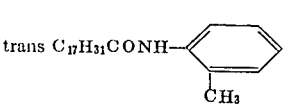

(m.p. 54°–55°C)    72

(m.p. 51°–52°C)    60

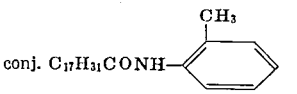

(m.p. 43°–46°C)    69

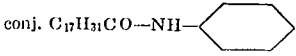

(m.p. 35°–37°C)    39

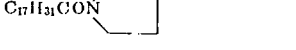

(b.p. 200°–205°C/0.03mmHg
$\eta_D^{31.5}$ 1.4813)    43

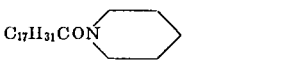

(b.p. 190°–193°C/0.03mmHg
$\eta_D^{30}$ 1.4770)    75

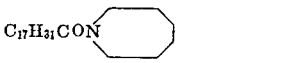

(b.p. 194°–197°C/0.08mmHg
$\eta_D^{30}$ 1.4855)    82

Acute toxicites of some of the amides used in the present invention are listed in the following Table 2.

TABLE 2

| Agents | $LD_{50}$ values (g/kg) mice | |
|---|---|---|
| | oral | intraperitoneal |
| $C_{17}H_{31}CONHCH(CH_3)_2$ | >50 | 1.0 |
| $C_{17}H_{31}CONH$–cyclohexyl | >50 | 9.0 |
| $C_{17}H_{31}CONH$–(2-methylphenyl) | >50 | 10.5 |
| $C_{17}H_{31}CONH$–CH(CH_3)–phenyl | >50 | 4.3 |
| linoleic acid | >50 | <1.0 |

As is seen from the above Table, no mortal case and no significant toxic symptoms were observed even in an abundant dose (per os) such as 0.5 g per 10 g., namely 50 g./kg. of body weight. Also, any of the significant toxic symptoms, as well as any mortal case, was not observed when N-cyclohexyl- or N-2-methylphenyllinoleamide in 1 percent, 0.5 percent or 0.2 percent amounts in the diet was administered to mice every day for 3 weeks. The appetite was normal and the digestive function was unchanged. When the internal organs were inspected by dissection, there was no appreciable change. This result was the same as that observed in tests on N-2-methylphenyl- linoleamide when used in rats.

In the above Table, the symbol ">" indicates "greater than" and the symbol "<" indicates "less than."

What is claimed is:

1. A method for reducing the elevated cholesterol level in the blood of patients having such elevated level, which comprises orally administering to said patient 0.1 g to 20 g per day of an N-substituted octadecadienoic acid amide of the formula

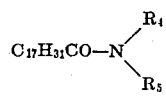

wherein $R_1$ is $\alpha$-($C_1$-$C_4$)-alkylbenzyl and $R_2$ is hydrogen.

2. The method according to claim 1, wherein the octadecadienoic acid moiety is selected from the group consisting of linoleic acid, conjugated linoleic acid, trans-linoleic acid and conjugated trans-linoleic acid.

3. The method according to claim 1, wherein the N-substituted octadecadienoic acid amide is N-($\alpha$-methylbenzyl)-linoleamide.

* * * * *

UNITED STATES PATENT OFFICE
CERTIFICATE OF CORRECTION

Patent No. 3,728,459          Dated April 17, 1973

Inventor(s) TAKASHI SEKI ET AL.

It is certified that error appears in the above-identified patent and that said Letters Patent are hereby corrected as shown below:

In the heading, after the information designated as "[63]", insert the following:

--[30]  Foreign Application Priority Data

| February 6, 1963 | Japan | 6314 |
| February 6, 1963 | Japan | 6315 |
| August 15, 1964 | Japan | 46998 |
| August 28, 1964 | Japan | 49074 |
| August 29, 1964 | Japan | 49120 |
| August 29, 1964 | Japan | 49121 -- |

Signed and sealed this 4th day of March 1975.

(SEAL)
Attest:

RUTH C. MASON
Attesting Officer

C. MARSHALL DANN
Commissioner of Patents
and Trademarks